United States Patent [19]

Collins

[11] 4,244,289

[45] Jan. 13, 1981

[54] APPARATUS FOR MARKING STRIP MATERIAL

[75] Inventor: Stephen Collins, London, England

[73] Assignee: Oakside Industrial, #19167, Holdings, Ltd., Middlesex, England

[21] Appl. No.: 29,033

[22] Filed: Apr. 11, 1979

[30] Foreign Application Priority Data

Apr. 25, 1978 [GB] United Kingdom ............... 16240/78

[51] Int. Cl.[3] ......................... B41J 1/22; G03B 19/18

[52] U.S. Cl. ............................. 101/93.18; 101/93.21; 101/93.26; 219/216; 400/192; 400/234; 400/615.2; 400/616.3; 352/55; 352/236

[58] Field of Search ................... 101/93.43, 70, 72–76, 101/78–79, 107, 110, 92, 93.18, 93.21, 93.26; 400/222, 234, 237, 241.4, 192, 615.2, 616.3; 352/55, 236; 219/216

[56] References Cited

U.S. PATENT DOCUMENTS

| | | | |
|---|---|---|---|
| 1,326,062 | 12/1919 | Jones | 352/236 |
| 2,566,953 | 9/1951 | Morris | 400/222 X |
| 2,576,041 | 11/1951 | Pitts | 101/73 X |
| 2,734,792 | 2/1956 | Bevins et al. | 400/222 X |
| 2,843,004 | 7/1958 | Pajes | 352/55 |
| 2,868,064 | 1/1959 | Hennel | 352/236 X |
| 2,993,805 | 7/1961 | Kay | 101/73 X |
| 3,120,800 | 2/1964 | Ward | 101/72 |
| 3,584,723 | 6/1971 | Anderson | 400/222 X |
| 3,752,291 | 8/1973 | Barouh et al. | 400/241.4 |
| 4,037,708 | 7/1977 | Arnott | 400/222 |

FOREIGN PATENT DOCUMENTS 906774 9/1962 United Kingdom .................. 400/219.1

*Primary Examiner*—E. H. Eickholt
*Attorney, Agent, or Firm*—Fulwider, Patton, Rieber, Lee & Utecht

[57] ABSTRACT

This invention relates to apparatus for marking strip material such as cinematographic film, the apparatus comprising means for feeding the film from a film supply station to a film take-up station via a printing station, means for feeding a tape carrying transferable marking material from a tape supply station to a tape take-up station via the printing station, said printing station including two movable members one carrying a printing block and the other carrying a back-up platen, the apparatus being arranged such that at said printing station the film and tape move between said two members in a superimposed relationship and such that when the printing block and platen are moved into co-operating, adjacent, relationship, selected print elements on the printing block causing marking material to be transferred from the tape to the strip material thereby to mark or print the strip material with data indicated by the selected print elements.

6 Claims, 4 Drawing Figures

APPARATUS FOR MARKING STRIP MATERIAL

This invention relates to apparatus for marking strip material, and is particularly applicable to marking or coding footages on cinematographic film.

It is an aim of the invention to provide marking apparatus which can be easily set up prior to the marking operation and which employs a dry method of marking or printing that avoids the disadvantages associated with a known wet method utilizing an ink.

According to the invention there is provided apparatus for marking strip material such as cinematographic film, the apparatus comprising means for feeding the film from a film supply station to a film take-up station via a printing station, means for feeding a tape carrying transferable marking material from a tape supply station to a tape take-up station via the printing station, said printing station including two movable members one carrying a printing block and the other carrying a back-up platen, the apparatus being arranged such that at said printing station the film and tape move between said two members in a superimposed relationship and such that when the printing block and platen are moved into co-operating, adjacent, relationship, selected print elements on the printing block cause marking material to be transferred from the tape to the strip material thereby to mark or print the strip material with data indicated by the selected print elements.

Figure 1:
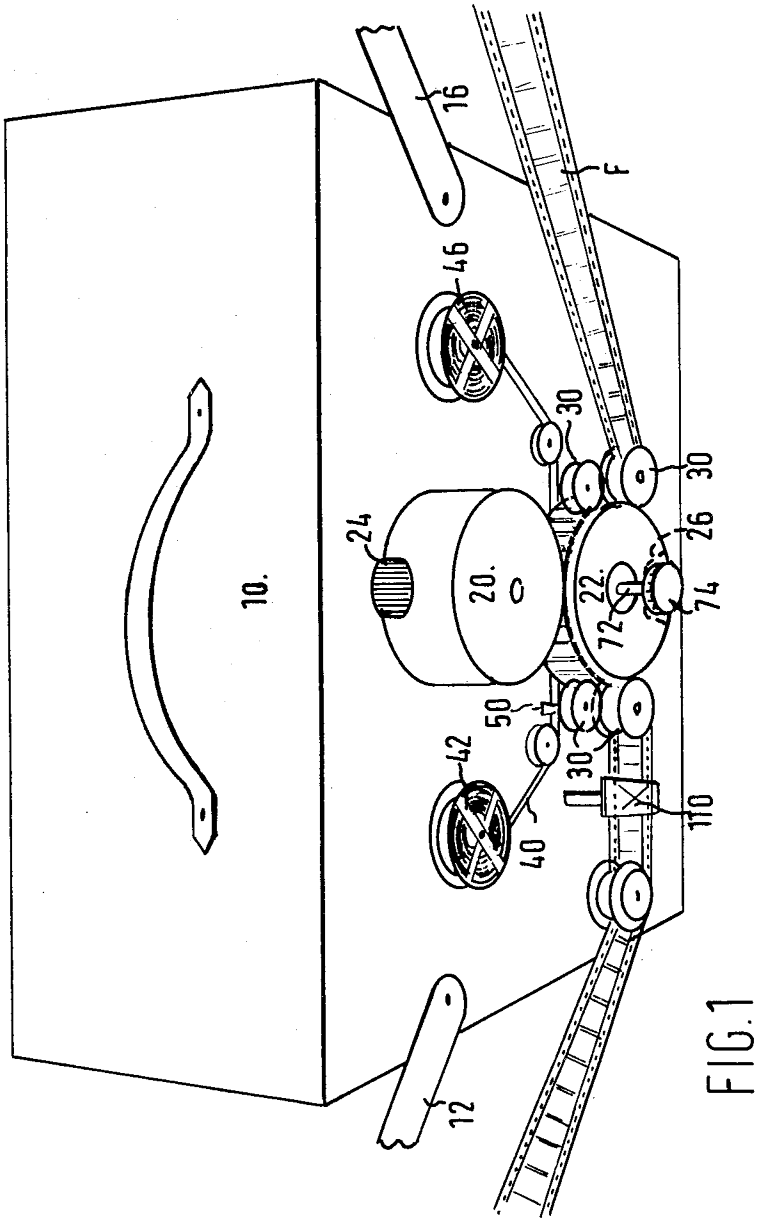
Figure 2:
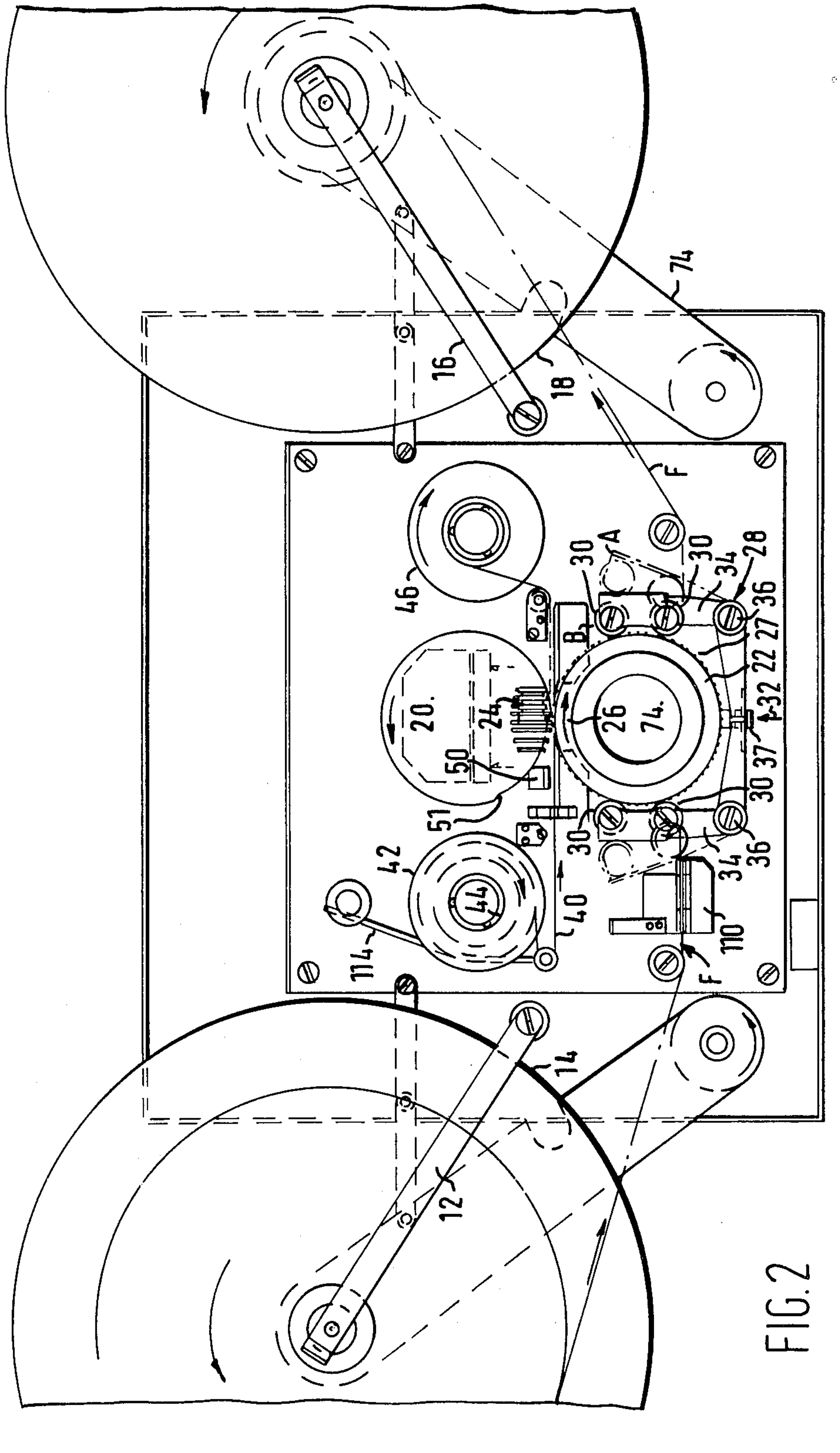
Figure 3:
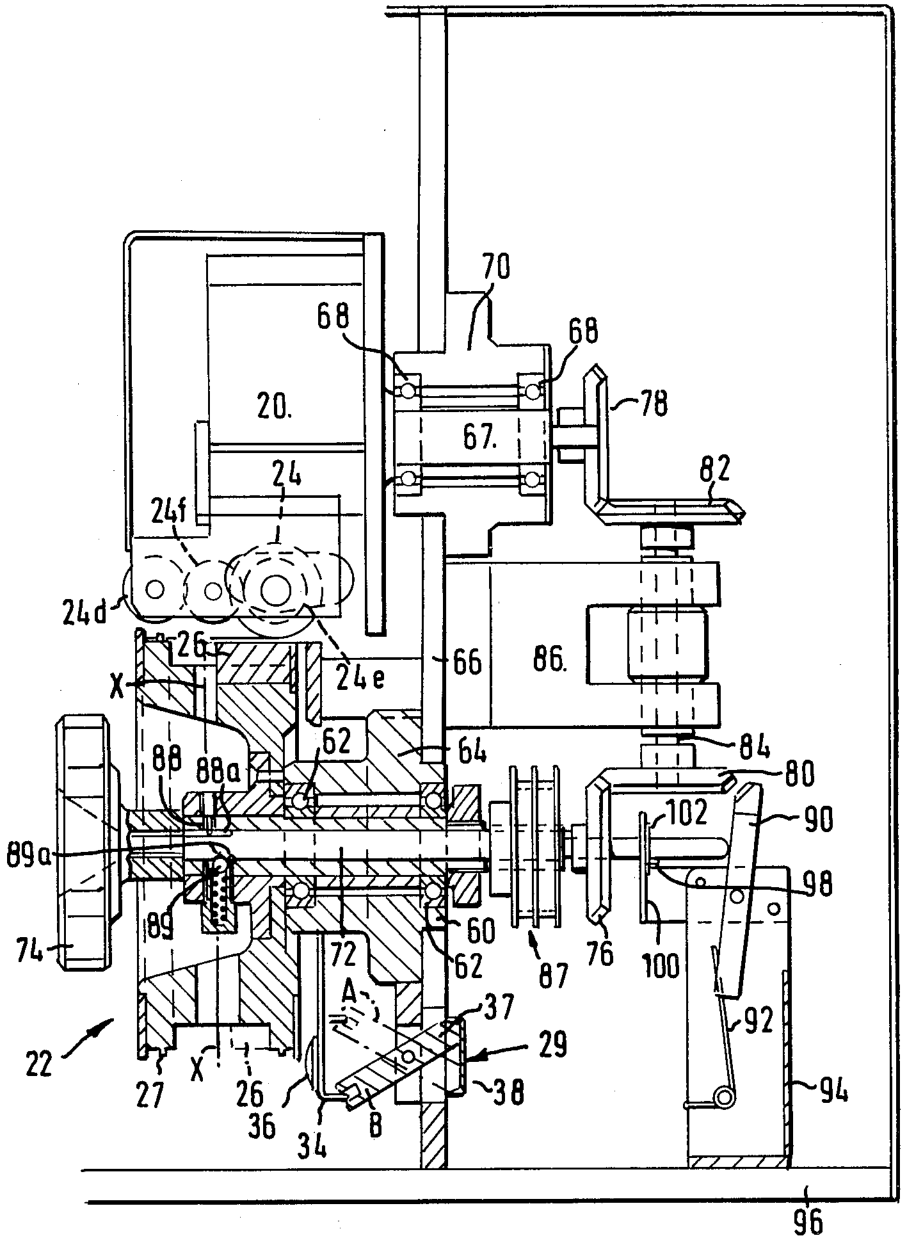
Figure 4:
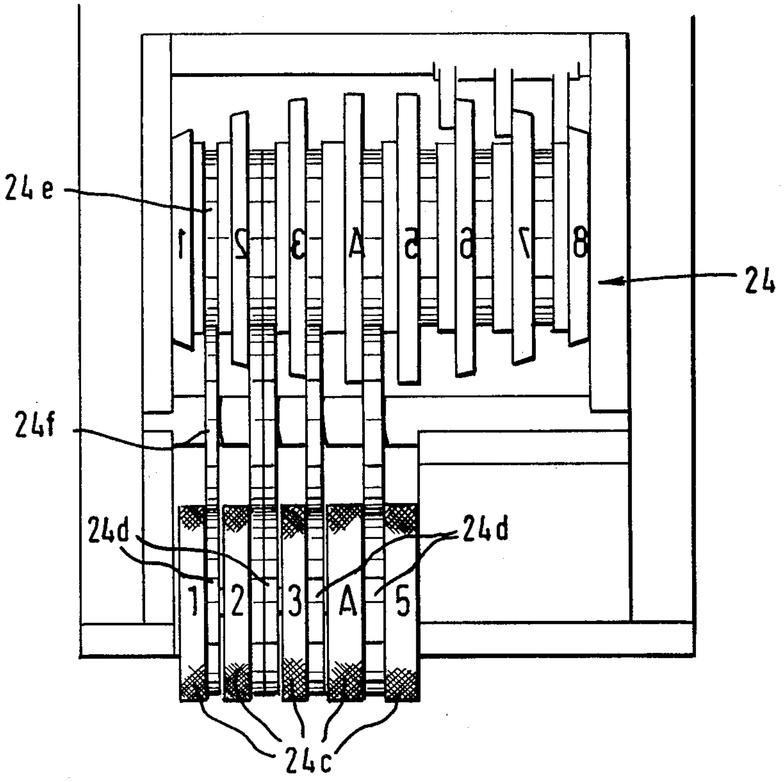

An embodiment of the invention will now be described by way of example only with reference to the accompanying drawings, in which:

FIG. 1 is a diagrammatic perspective sketch of marking apparatus according to the invention, and used for coding or marking cinematographic film, FIG. 2 is an elevation of the marking apparatus of FIG. 1, FIG. 3 is a section through an inching wheel mechanism of the apparatus of FIG. 2 and, FIG. 4 is a plan view of a printing block of the apparatus of FIG. 1.

Referring to the drawings, the cinematographic film coding apparatus includes a housing 10 from which extends an arm 12 for supporting a film supply spool 14, and an arm 16 for supporting a film take-up spool 18. Located on a front face of the housing are two motor driven, contra-rotating, wheels 20 and 22, the upper one carrying at its periphery a printing block 24 and the lower one carrying a back-up platen 26. The wheels are geared together for simultaneous contra-rotation so that when the printing block is at a 6 o'clock position, the platen is positioned at a 12 o'clock position adjacent the printing block to co-operate therewith and to define therebetween a printing station.

Extending around the periphery of lower wheel 22 is a series of spaced sprockets 27, for engagement in corresponding spaced holes in the longitudinal edge regions of the film, the film being maintained in contact with the upper periphery of wheel 22 by means of a pressure device 28.

Device 28 includes an over-center, bi-stable mechanism 29 which allows film engaging pressure members 30 to be located in a first position 'A' remote from the periphery of wheel 22 to permit threading of the film thereon, and in a second position 'B' adjacent the periphery to maintain the film in correct location with the sprockets 24, movement between these positions being effected by manual pressure being applied at a central point 32 of the mechanism. Members 30 are carried by L-shaped arms 34 pivotedly mounted at 36, and mechanism 29 includes a lever 37 engaging at one end a flat spring 38 and at the other end the arms 34.

Superimposed on the film at the printing station is a tape 40 composed of a backing material on which is bonded a transferable marking material. The tape is fed from a supply spool 42 rotatable against the action of a friction brake 44, and is wound on a take-up spool 46 driven via a slipping clutch arrangement (not shown).

When the printing block and platen are rotated into co-operating adjacent relationship, selected print elements on the printing block cause marking material to be transferred from the tape to the film thereby to mark or print the film with data indicated by the selected print elements. During the printing operation, the tape will be gripped between the elements and platen and pulled through the printing station. As the printing block leaves the printing station, a tape brake 50 is actuated by a wheel cam mechanism 51 to clamp the tape to prevent further tape movement until the printing block next approaches the printing station, when the brake will be temporarily released in readiness for the next printing operation.

The printing block shown in FIG. 4 is particularly suited for marking or coding footages on cinema film for editing purposes. Thus, the first three rotary printing wheels or numbered elements 24*a* are normally settable to indicate the number of the scene, the next two printing wheels 24*b* are again manually settable and indicate respectively a letter identifying which camera shot the scene and the take number.

The last three numbered wheels 24 are interlinked in well known fashion so that they can be quickly zeroed and so that after each revolution of the wheels 20 and 22, the numbered wheels will be automatically indexed by one. To manually set the five left hand printing wheels, there is provided five knurled manually actuable knobs 24*c* having numbers and letters shown thereon the correct way round for easy reference, gear wheels 24*d* on the knobs being in mesh with gear wheels 24*e* on the printing wheels via intermediate gear wheels 24*f*.

Referring in detail now to the motor drive for wheels 20 and 22, see FIG. 3, it will be seen that the lower wheel 22 is supported on a sleeve 60 which in turn is supported in a pair of bearings 62 set in a boss 64 secured to a vertical housing wall 66. Wheel 20 is mounted on a shaft 67 set in bearings 68 in a boss 70 secured to the housing wall 66.

Passing through the sleeve 60 is a shaft 72 carrying at its left hand end an enlarged knob 74 and at its right hand end a bevel gear 76, which meshes with a bevel gear 78 on shaft 67 via bevel gears 80 and 82 secured to shaft 84 supported in a rotatable structure 86.

Drive for the wheels 20 and 22 is provided by an electric motor (not shown) which drives by a belt (not shown) one pulley of a two pulley block 87 secured to shaft 72; the other pulley drives the film take-up spool 18 via belt 74.

As will be appreciated later, there is provided the facility of enabling the upper wheel 20 to be temporarily locked in a position where the printing block is diametrically opposite the printing station (that is when the block is at its 12 o'clock position), and enabling the gearing between the wheels 20 and 22 to be temporarily disengaged to permit the lower wheel to be angularly rotated relative to the upper wheel. This is achieved by allowing the shaft 72 to be axially moved (by means of knob 74) from the position shown in FIG. 3 toward the left by a small amount; axial movement only of the shaft relative to sleeve 60 is ensured by co-operating key 88 and keyway 88*a*, the limit positions of axial movement being defined by a spring biased index ball bearing 89 engageable in either of two recesses 89*a* formed in shaft 72. When the shaft is in its extreme left hand position, bevel gear 76 is disengaged from bevel gear 80 thereby disengaging the transmission between wheels 20 and 22, and bevel gear 80 is prevented from rotation (thereby locking wheel 20) by a locking lever 90 which is spring biased into engagement with bevel gear 80 by spring 92 as shaft 72 moves to the left; lever 90 is pivoted on a bracket 94 secured to a base 96 of the apparatus. Movement of shaft 72 to the left is only possible when printing block 24 is located at a 12 o'clock position and this is achieved by providing a key 98 on shaft 72 in the region where is passes through an extension piece 100 of bracket 94, and providing piece 100 with an appropriately positioned key opening 102 to allow key 98 to pass when the block is at the 12 o'clock position.

Positioned to the left of the lower wheel 22 is a frame finder, or open structure 110 which overlays the film F when laced or threaded in the apparatus.

To set up a film ready for coding, the knob 74 is turned to position wheel 20 with the printing block in its 12 o'clock position. The knob is then pulled out to lock upper wheel 20 and release lower wheel 22. Now the film can be inched forward by knob 74 over the lower wheel 22 until the required frame on which to start the coding operation appears in the frame finder. The appropriate numbers to denote that frame are then set-up on the printing block. The distance of the frame 110 from lower wheel 22 is such that when the wheels are reengaged and driven, the printing block will pass through the printing station at the same time as the required frame to be coded.

Since the distance between the end of one take on the film and the beginning of the next take is probably not an integral number of feet, the back-up platen in the above described apparatus will not be located in the correct 6 o'clock position after the next selected frame has been located in the structure 110; relacing of the film about the lower wheel is therefore necessary. To overcome this problem, the back-up platen can be lengthened (shown dotted in FIG. 3) to extend around the entire periphery of the lower wheel 22, so that the angular position of the lower wheel at the instant the selected frame has been "inched" into the structure 110 is unimportant. In this modification, the sprockets on the inside of wheel 22 would be omitted. Alternatively, the wheel 22 may be separated along the plane XX, the inner part carrying a back-up platen extending partially around the periphery of wheel 22, the remaining portion of the circumferance being without sprockets but of the same radius as the back-up platen. The inner part would be permanently geared via gears 76 to 82 to the upper wheel 20. The outer part carries sprockets 27 and is releasably connected to the inner part by means of a plunger engaging in a selected one of a plurality of splines formed on shaft 72. The plunger is manually withdrawable to permit knob 72 to rotate the outer part relative to the inner part during the setting up operation to inch the film forward until a selected frame is positioned within structure 110; the plunger is then repositioned in an adjacent spline. In this operation, the angular relationship between platen 26 and the printing block 24 remains undisturbed.

During the printing or coding of any one take, the structure 110 may be hinged away from the film to avoid damaging the film.

To reduce take-up stresses in the marking tape each time the marking tape is pulled through the printing station by the action of the printing block and platen, there is provided a tensioning arm 114 positioned between the tape supply spool and the printing station to maintain a loop of tape unwound from the supply spool.

By employing a dry method of marking, all the disadvantages associated with an ink method of marking are eliminated. Thus the apparatus can operate at higher speeds as there is no ink drying time to be accounted for, and the printing block does not have to be stripped out and soaked after each use to prevent clogging of the ink. It also allows a sighting frame to be positioned away from the printing block so that positioning of the required frame can be easily adjusted by inching knob 72 after a simple 'anywhere' film lace-up. It further allows printing from above the film which facilitates setting of the printing block and which enables all film to be laced up the same way and the way that the Editor has marked it, working surface up.

In addition to cimematographic film, the above described is also particularly suited for coding magnetic tape.

If necessary, the printing block could include a heater to enable a hot method of printing.

I claim:

1. Apparatus for marking strip material such as cinematographic film, the apparatus comprising means for feeding the film from a film supply station to a film take-up station via a printing station, means for feeding a tape carrying transferable marking material from a tape supply station to a tape take-up station via the printing station, said printing station including two movable members, one carrying a printing block and the other carrying a back-up platen, the apparatus being arranged such that at said printing station the film and tape move between said two members in a superimposed relationship, and such that when the printing block and platen are moved into co-operating, adjacent relationship, selected print elements on the printing block cause marking material to be transferred from the tape to the film, thereby to mark or print the film with data indicated by the selected print elements, wherein the tape is pulled through the printing station by a contra-rotating action of the members during the printing operation, the apparatus further including a tape brake mechanism for preventing tape feed except during each printing operation, transmission gearing for coupling together said two members for simultaneous contra-rotation, and manually actuated means operable, when said one member is positioned with the printing block located diametrically opposite said printing station, to temporarily lock said one member in that position and to temporarily disengage said gearing so that said other member may be angularly rotated relative to said one member.

2. The apparatus of claim 1, including a series of sprockets spaced about the periphery of said other member for engagement in corresponding holes in a longitudinal edge region of the strip material, rotation of said other member in an appropriate direction causing strip material to be fed through the printing station.

3. The apparatus of claim 2, including an open structure locatable adjacent the strip material, the apparatus being such that in the temporarily locked position of said one member said other member can be rotated to bring a selected portion of the strip material within said structure, and such that with the gearing between said members reengaged, said members can be contra-rotated to bring said selected portion to the printing station simultaneously with the arrival of the printing block at the printing station.

4. Apparatus for marking strip material such as cinematographic film, having holes in a longitudinal edge region of the strip material, the apparatus, comprising means for continuously feeding the strip from a strip supply station to a strip take-up station via a printing station, means for feeding a tape carrying transferable marking material from a tape supply station to a tape take-up station via the printing station, said printing station including first and second members continuously rotatable during use and coupled together for simultaneous contra-rotation, the first member carrying a printing block and the second member carrying a back-up platen, a series of sprockets spaced about the periphery of one of the two members for driving engagement in said holes in the strip, the apparatus being arranged such that at the printing station the strip and tape lie between said first and second members in a superimposed relationship and such that when the printing block and platen are rotated during use into co-operating adjacent relationship the tape is gripped by said members to move with the strip through the printing station where selected print elements on the printing block cause marking material to be transferred from the tape to the strip, thereby to mark or print the strip with data indicated by the selected print element, and including a tape brake mechanism operable to prevent tape feed except when released by the co-engagement with one of said first and second members prior to each printing operation.

5. Apparatus for marking strip material such as cinematographic film, the apparatus comprising means for continuously feeding the strip from a strip supply station to a strip take-up station via a printing station, means for feeding a tape carrying transferable marking material from a tape supply station to a tape take-up station via the printing station, said printing station including first and second members continuously rotatable during use and coupled together by gearing for simultaneous contra-rotation, the first member carrying a printing block and the second member carrying a back-up platen, the apparatus being arranged such that at the printing station the strip and tape lie between said first and second members in a superimposed relationship and such that when the printing block and platen are rotating during use into co-operating adjacent relationship the tape is gripped by said members to move with the strip through the print station where selected print elements on the printing block cause marking material to be transferred from the tape to the strip, thereby to mark or print the strip with data indicated by the selected print elements, the apparatus further including manually actuated means operable, when said first member is positioned with the printing block located diametrically opposite said printing station, to temporarily lock said first member in that position and to temporarily disengage said gearing so that said second member can be angularly rotated relative to said first member to cause the strip to be fed through the printing station.

6. The apparatus of claim 5, and further including an open structure locatable adjacent the strip material, the apparatus being such that in the temporarily locked position of said first member said secod member can be rotated to bring a selected portion of the strip material within said structure, and such that with the gearing between said members re-engaged, said members can be contra-rotated to bring said selected portion to the printing station simultaneously with the arrival of the printing block at the printing station.

* * * * *